March 22, 1960 W. SWAROFSKY 2,929,308
PHOTOGRAPHIC CAMERA HAVING EXCHANGEABLE OBJECTIVES
Filed Dec. 28, 1956

INVENTOR
WALTER SWAROFSKY

BY
ATTORNEYS

United States Patent Office 2,929,308
Patented Mar. 22, 1960

2,929,308

PHOTOGRAPHIC CAMERA HAVING EXCHANGEABLE OBJECTIVES

Walter Swarofsky, Braunschweig, Germany, assignor to Voigtlander Aktiengesellschaft, Braunschweig, Germany, a corporation of Germany Application December 28, 1956, Serial No. 631,332

Claims priority, application Germany January 12, 1956

2 Claims. (Cl. 95—64)

This invention relates to photographic cameras provided with exchangeable objectives and it has particular relation to photographic cameras of this type, in which an iris diaphragm is built-in in the mount of each exchangeable objective.

It has been known to arrange the iris diaphragm between lens members of the picture-taking objective and to arrange the adjusting member for such iris diaphragm on the mount of the exchangeable objective. However, the shutter and its time-adjusting member are in some cases fixedly connected with the photographic camera, i.e. they are not exchangeable together with the objective. If the shutter is a focal plane shutter, it is in general fixedly built-in in the camera body.

If in such a camera—in which the shutter is arranged separately from the objective—the diaphragm-adjusting member and the time-adjusting member are supposed to be coupled in the sense of light value adjustment, the provision of such coupling between the time-adjusting member which is stationary in the camera casing and the diaphragm-adjusting member which is detachable from the casing, causes constructive difficulties. The distance in space between these adjusting members is then greater than in coupling devices used for a time-adjusting member and a diaphragm-adjusting member which are arranged on a common objective shutter casing. Furthermore, the reading scales for time and diaphragm values are also more removed from each other so that reading of the adjusted values is rendered more difficult.

The main object of the present invention is to eliminate these defects and to provide a structure, in which constructively simple, e.g. conventional, coupling members can be used between the time-adjusting member and the diaphragm-adjusting member. Thereby, handling of the coupling device is simplified and reading of the adjusting scales is rendered easier.

It is contemplated according to the present invention to arrange in photographic cameras of the above mentioned type the adjusting member for the objective diaphragm, on the camera body. Thus, the objective diaphragm can be adjusted only when the mount of the exchangeable objective is connected with the camera body and simultaneously a coupling exists between the adjusting member and the objective diaphragm.

In order to provide a coupling between transmission members arranged in the camera and in the mount of an exchangeable objective, from the diaphragm adjusting member to the objective diaphragm, it is necessary to fix the point of attachment of the objective mount in the camera. It is preferred to provide for this purpose a pin on the objective mount, which upon proper attachment has to enter a bore provided in an extension piece fixedly connected with the camera. However, it will be understood that said point of attachment can be fixed also by other means.

It has been found to be of advantage to arrange the diaphragm-adjusting member co-axially with the time-adjusting member of the shutter. In a camera provided with a central shutter arranged on its front wall, it is of advantage to design the diaphragm-adjusting member as a ring and to arrange it on the central shutter casing, or on the camera body, co-axially relative to the time-adjusting ring of the central shutter. The time-adjusting ring and the diaphragm-adjusting ring can be then connected with each other in a simple manner by means of conventional coupling members which can be switched on and off.

If the photographic camera has a focal plane shutter or slit shutter, the time-adjusting member of the shutter can be designed in conventional manner as a ring and applied to the camera front wall in such a manner that it encloses the optical axis of the picture-taking objective. The beforementioned diaphragm-adjusting ring can be also arranged there in a similar manner, so that in this case too the two adjusting members can be coupled by means of conventional and simple structural elements.

The transmission of adjusting forces from the diaphragm-adjusting member arranged on the camera body, to the iris diaphragm arranged in the mount of the exchangeable objective, can be carried out in various ways. It is for example possible to use therefor a toothed wheel gearing, which is seated partly in the mount of the exchangeable objective and partly in the camera body, whereby parts of said gearing enter a coupling connection upon applying the exchangeable objective to the camera. Lever gearings or slide gearings, or a gearing combined of such members can be, however, also used. It is of particular advantage to provide the diaphragm adjusting ring arranged on the camera body with a control cam, and have lying against said cam a two-armed lever pivoted in the camera body, the other arm of said lever being in contact with a contact pin which is arranged in the camera body in an axially displaceable manner. Upon applying an exchangeable objective to the camera, a diaphragm-adjusting pin which is axially displaceably arranged in the objective mount, will come into connection with said contact pin. Said diaphragm-adjusting pin acts upon its axial displacement on an inclined surface provided in the ring for adjusting the lamellae of the iris diaphragm in such a manner that it causes said ring for adjusting the lamellae to turn, whereby the lamellae are caused to move, i.e. the iris diaphragm is caused to open or close. It is preferred to put the ring for adjusting the lamellae of the iris diaphragm under the effect of a draw spring, which tends to draw it to a position in which it fully opens the diaphragm. The result of this arrangement is that the diaphragm-adjusting ring can be in any adjusting position when an exchangeable objective is applied to the camera and that upon attaching the objective, the iris diaphragm adjusts itself to the value indicated by the diaphragm-adjusting ring. Upon removing the objective from the camera, the iris diaphragm will be fully opened.

If the exchangeable objectives provided for a camera are of varying speed, care must be taken that the diaphragm-adjusting member which is arranged on the camera and serves for all of said objectives, should not be adjusted to diaphragm values, to which the iris diaphragms of some of the exchangeable objectives are not adjustable. Thus, if for example the strongest exchangeable objective has a lens aperture ratio of 1:2 so that the diaphragm-adjusting member can be adjusted also to the diaphragm value "2," in the case of another exchangeable objective having a lens aperture ratio of 1:3.5, the diaphragm-adjusting member should be adjustable only to the largest diaphragm value "3.5," when this objective is attached to the camera.

Therefore, according to the present invention the mount of each exchangeable objective is provided with a stop member which—when the objective is attached to the camera—projects into the range of movement of a stop flap which is in connection with the diaphragm-adjusting member. By this it is attained not only that the diaphragm-adjusting member can be adjusted only up to the largest diaphragm value corresponding to the speed or strength of illumination of the respective exchangeable objective, but the attachment of an exchangeable objective to a camera, in which the diaphragm-adjusting member is set to a diaphragm value, to which the iris diaphragm of this exchangeable objective cannot be adjusted, is simultaneously prevented. For example, attachment of an exchangeable objective having an aperture ratio of 1:3.5 is prevented when the diaphragm-adjusting member is set to the diaphragm value of "2.8" or "2."

However, said objective can be attached to the camera when the diaphragm-adjusting member is set to the diaphragm value "3.5" or "8" or "11," whereby the iris diaphragm is at once set to the adjusted diaphragm value when the objective is attached to the camera.

It will be understood that coupling devices of various constructions can be used between the diaphragm-adjusting member arranged according to this invention and the time-adjusting member of the shutter. According to one of these modifications, the time-adjusting ring of the shutter, which is arranged coaxially relative to the diaphragm-adjusting ring, is axially displaceable. Thereby in one end position of the time-adjusting ring, an attachment fastened to the diaphragm-adjusting ring, e.g. a coupling pin, projects into a slot or groove provided in the time-adjusting ring, so that a coupling between these adjusting members is brought about. In the other end position of the time-adjusting ring, the coupling pin fastened to the diaphragm-adjusting ring emerges from the groove of the time-adjusting ring, whereby the coupling connection is released.

The appended drawings illustrate by way of example and without limitation, some embodiments of and some best ways for carrying out the invention.

In the drawings—

Figure 1:
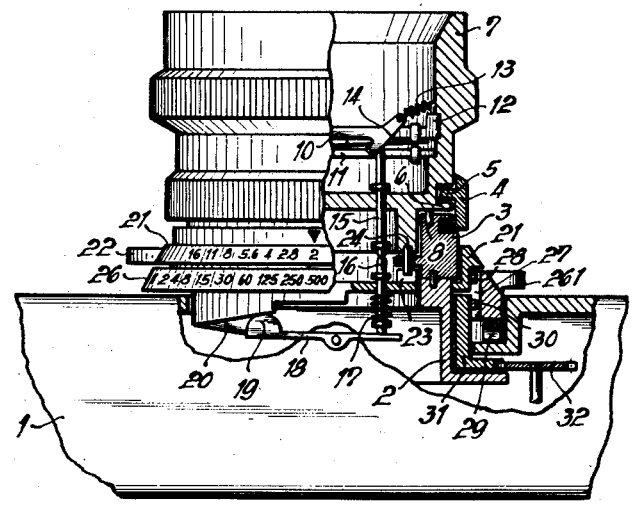
Figure 1 is a top plan view of a partially broken up objective which is fastened to a camera body.
Figure 2:
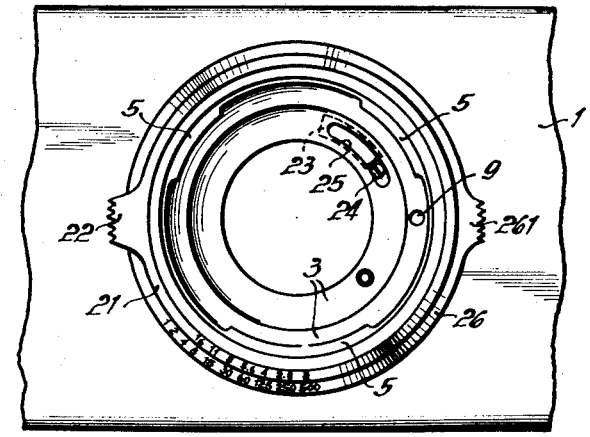
Figure 2 is a front view of the camera casing, with the exchangeable objective removed.

Referring now to the drawings in detail, reference numeral 1 denotes a camera casing, on the wall part 2 of which a tube-shaped attachment 3 is fastened, in which a collar ring 4 is held and rotatably arranged. This ring 4 is provided with several bayonet flaps 5, which are capable of gripping behind corresponding counterparts 6 provided on the mount 7 of an exchangeable objective, whereby mount 7 can be fixedly connected with member 3. A pin 8, or the like, is fastened to mount 7 and a bore 9 is provided in member 3 so that mount 7 can be fastened to member 3 only when pin 8 projects into bore 9.

An iris diaphragm is arranged in the mount 7. The lamellae of the diaphragm, of which only one is shown in the drawing and denoted by reference symbol 10, are fastened, on the one hand on a not-displaceable ring 11 and, on the other hand, on a lamella-adjusting ring 12. The latter is under the effect of a draw spring 13, which tends to draw it to a position, in which the iris diaphragm is fully opened. The ring for adjusting the lamellae is also provided with an inclined surface 14, against which a diaphragm-adjusting pin 15—which is axially displaceably arranged in the mount 7—lies. Upon applying mount 7 to the camera casing 1, said diaphragm-adjusting pin 15 comes in connection with a contact pin 16 which is axially displaceably guided in the camera casing. Contact pin 16 is under the effect of a compression spring 17, which holds said pin 16 in contact with a double-armed lever 18, which is pivoted in the camera casing 1, whereby contact element 19 of said lever 18 is pressed against a control cam 20. This cam 20 is located on a diaphragm-adjusting ring 21, which is arranged around member 3 and said ring 21 is connected with an adjusting handle 22. Thus, displacement of diaphragm-adjusting ring 21 brings about, over control cam 20, swinging of lever 18, which in turn axially displaces contact pin 16 and diaphragm-adjusting pin 15, whereby by the action of pin 15 on the inclined surface 14, the lamellae-adjusting ring 12 is turned and thereby adjusts the diaphragm lamellae 10 in order to bring about opening or closing of the iris diaphragm.

In the embodiment illustrated by way of example in the drawings, the objective has an aperture ratio of 1:2. The iris diaphragm is adjusted—as shown in the diaphragm scale of the drawing—to the highest possible diaphragm value "2." If now another exchangeable objective contemplated for the same camera has an aperture ratio of 1:4, upon attaching such objective to the camera, adjustment of the diaphragm-adjusting ring 21 to the diaphragm values "2.8" and "2," must be prevented.

In order to attain this, a stop flap 23 is provided on the diaphragm-adjusting ring 21 and a stop member—for example a pin 24—is arranged at a predetermined point of the mount of every exchangeable objective contemplated for the camera, said pin 24 projecting into the range of movement of said flap 23. This pin 24 passes through a kidney-shaped recess 25 provided in a collar of attachment 3. The point at which pin 24 is fastened to mount 7 is selected in such a manner that it limits the rotary movement of the diaphragm-adjusting ring 21 (which takes place in the sense of opening the diaphragm) at the diaphragm-adjusting value, which corresponds to the speed or strength of the objective.

Simultaneously, the above described device also prevents a step of fixedly connecting an exchangeable objective with a camera at a time when the diaphragm-adjusting ring 21 is adjusted to a diaphragm value, to which the iris diaphragm of this objective cannot be opened. It will be understood that in such a case the flap 23 stands on the diaphragm-adjusting ring 21 in such position that upon applying mount 7, pin 24 impinges on the flap and thereby prevents fastening of mount 7 to member 3. Not until the diaphragm-adjusting ring 21 is adjusted to a diaphragm value which corresponds to the speed of the exchangeable objective or to a still smaller diaphragm opening, will pin 24 be able to enter recess 25, unobstructed by flap 23, whereupon mount 7 can be fastened to member 3.

Co-axially with diaphragm-adjusting ring 21, a time adjusting ring 26, which is provided with an adjusting handle 261, is arranged on the front wall of the camera. The time adjusting ring is provided with a groove 27 which extends parallel to its axis. The latter is engaged by a coupling pin 28 arranged on the diaphragm-adjusting ring 21, so that—in the position of the parts shown in the drawing—upon displacement of the time adjusting ring 26, the diaphragm-adjusting ring 21 is also moved, i.e. upon displacement of the latter the time-adjusting ring 26 is also adjusted. In order to release this coupling, time adjusting ring 26 can be axially displaced against the effect of a curved leaf spring 29, whereupon the time adjusting ring and the diaphragm-adjusting ring can be adjusted independently from each other.

In addition to coupling pin 28, groove 27 is also engaged by a further coupling pin 30, which is fastened to a setting ring 31 which meshes with a cog-wheel 32 which transmits movements of the time-adjusting ring 26 to a time-adjusting organ of a focal plane shutter not shown in the drawing.

The fixed arrangement of the diaphragm-adjusting organ on the camera body is of advantage not only in view of the easy coupling with the time-adjusting organ of the shutter, but it is of particular importance and advantages if adjustment of the exposure conditions (time and diaphragm) is effected not by hand but by an adjusting device which is built-in in the camera and is controlled, for example, by an electric exposure meter.

It will be understood from the above that this invention is not limited to the details specifically described above and illustrated in the drawings and can be carried out with various modifications without departing from the scope of the invention, as defined in the appended claims.

What is claimed is:

1. A photographic camera for use with individual interchangeable objectives, comprising, on its front wall, means for the attachment of one of said individual interchangeable objectives; each of said individual interchangeable objectives having an objective mount, a built-in iris diaphragm having adjustable lamellae, and a ring for adjusting said lamellae, arranged within said mount and being engaged by one of the ends of each of the diaphragm lamellae; a setting ring arranged in the camera body coaxially with the objective mount, for causing displacement of said lamellae adjusting ring in order to regulate the diaphragm opening; a setting pin axially displaceably arranged in the mount of said exchangeable objective and coupled at one of its ends with said ring for adjusting the lamellae, the other end of said setting pin projecting from the front surface turned toward the camera body, of the objective mount, for operatively engaging said setting ring, in attached position of said interchangeable objective to the camera; said lamellae adjusting ring having a control surface inclined relative to the optical axis and being under the effect of a spring urging said ring to its end position for fully opening the diaphragm; said setting pin extending in the direction of the optical axis and lying at said one of its ends against said inclined control surface; a contact pin being axially displaceably arranged in the camera body, aligned with and adapted to be engaged by said setting pin; said setting ring arranged in the camera body being provided with a control cam; a two-armed lever being arranged in the camera body; a spring acting on said contact pin in order to urge the inner end of the contact pin to lie against one arm of said two-armed lever, whereby the other arm of said lever lies against said control cam, in order to transmit displacement of the setting ring over the contact pin and the setting pin, to said lamellae adjusting ring.

2. A photographic camera as claimed in claim 1, comprising a stop member provided on the mount of said one of the interchangeable objectives and a stop flap connected with the setting ring arranged in the camera body, said stop member projecting into the range of a movement of said stop flap, upon applying said interchangeable objective to the camera, in order to limit the range of movement of said setting ring; an axially displaceable time-adjusting ring of the shutter, arranged co-axially with said setting ring; a coupling pin fastened on the setting ring and a groove provided in the time-adjusting ring; said coupling pin projecting into said groove in one end position of the time-adjusting ring in order to bring about coupling of the time-adjusting ring with the setting ring; said coupling pin emerging in the other end position of the time-adjusting ring from said groove in order to release the coupling between the setting ring and the time-adjusting ring.

References Cited in the file of this patent

UNITED STATES PATENTS

| 2,222,298 | Nerwin | Nov. 19, 1940 |
| 2,319,304 | Dalotel | May 18, 1943 |
| 2,672,798 | Snyder | Mar. 23, 1954 |
| 2,725,805 | Jackson et al. | Dec. 6, 1955 |
| 2,829,574 | Gebele | Apr. 8, 1958 |
| 2,830,513 | Sauer | Apr. 15, 1958 |

FOREIGN PATENTS

| 517,036 | Germany | Jan. 30, 1931 |
| 1,106,716 | France | July 27, 1955 |